United States Patent [19]

Wilson et al.

[11] Patent Number: 4,620,960
[45] Date of Patent: Nov. 4, 1986

[54] METHOD AND APPARATUS FOR REMOVABLY MOUNTING A TOP NOZZLE ON A NUCLEAR REACTOR FUEL ASSEMBLY

[75] Inventors: John F. Wilson, Murrysville; Robert K. Gjertsen, Monroeville; John M. Shallenberger, Fox Chapel, all of Pa.

[73] Assignee: Westinghouse Electric Corp., Pittsburgh, Pa.

[21] Appl. No.: 644,756

[22] Filed: Aug. 27, 1984

[51] Int. Cl.[4] ............................................... G21C 3/32
[52] U.S. Cl. ..................................... 376/446; 376/448; 376/449; 376/451
[58] Field of Search ................. 376/446, 448, 449, 451

[56] References Cited

U.S. PATENT DOCUMENTS

| | | | |
|---|---|---|---|
| 3,235,463 | 2/1966 | Sankovich | 376/446 |
| 3,828,868 | 8/1974 | Jabsen | 376/446 |
| 4,265,010 | 5/1981 | Doss | 376/362 |

FOREIGN PATENT DOCUMENTS

| | | | |
|---|---|---|---|
| 0036821 | 9/1981 | European Pat. Off. | 376/446 |
| 1228610 | 4/1971 | United Kingdom | 376/446 |

*Primary Examiner*—Donald P. Walsh

[57] ABSTRACT

A top nozzle of a nuclear reactor fuel assembly is removably mounted to the guide thimbles of the fuel assembly by mating and unmating of pluralities of outer and inner sockets defined in the respective top nozzle and guide thimbles. A bearing plate supported on the top nozzle and movable relative thereto between a lower, non-release position and an upper, release position supports a plurality of locking tubes which are inserted at their lower end portions into the outer sockets. When the bearing plate is at its non-release position, the lower end portions of the locking tubes are inserted into the inner sockets and prevent them from unmating from the outer sockets and thereby retain the top nozzle mounted to the guide thimbles. However, when the bearing plate is at its release position, the locking tube lower end portions are withdrawn from the inner sockets and allow them to unmate from the outer sockets and thereby allow lifting of the top nozzle off and removal from the guide thimbles. During normal operation, the bearing plate is retained at its lower, non-release position by a set of lower removable stops, but upon their removal the plate can move to its upper release position against an upper set of fixed stops. At such position of the plate, the top nozzle can be removed from the guide thimbles.

14 Claims, 8 Drawing Figures

METHOD AND APPARATUS FOR REMOVABLY MOUNTING A TOP NOZZLE ON A NUCLEAR REACTOR FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly with a Removable Top Nozzle" by John M. Shallenberger et al, assigned U.S. Ser. No. 06/644758 and filed 8/27/84.

2. "Removable Top Nozzle and Tool for a Nuclear Reactor Fuel Assembly" by John F. Wilson et al, assigned U.S. Ser. No. 06/564058 and filed 12/21/83.

BACKGROUND OF THE INVENTION

1. Field of the Invention

The present invention relates generally to fuel assemblies for nuclear reactors and, more particularly, is concerned with improved method and apparatus for mounting a top nozzle on the fuel assembly which increase holddown spring reliability and allow the top nozzle to be removed more readily from the fuel assembly.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array of grids spaced along the fuel assembly length and attached to the control rod guide thimbles. Top and bottom nozzles on opposite ends of the assembly are secured to the guide thimbles so as to form the fuel assembly as an integral unit. The respective top and bottom nozzles extend slightly above and below the ends of the fuel rods, capturing the rods therebetween. An example of a nuclear reactor having fuel assemblies of this conventional design is the one described in U.S. Pat. No. 3,235,463 to Sankovich.

During operation of such fuel assemblies in a nuclear reactor such as the one described in the aforesaid patent, the fuel rods may occasionally develop cracks along their lengths resulting primarily from internal stresses. Since the fuel rods are part of the integral assembly of guide thimbles welded to the top and bottom nozzles, it is difficult to detect and remove the failed rods. To gain access to these rods, it is necessary to remove the affected assembly from the nuclear reactor core and then break the welds which secure the nozzles to the guide thimbles. In so doing, the destructive action often renders the fuel assembly unfit for further use in the reactor because of the damage done to both the guide thimbles and the nozzle which prohibits rewelding. In a nonwelded attachment arrangement, such as illustrated and described in British Pat. No. 1,228,610, disassembly of the fuel assembly would prove to be equally difficult. Here, the upper ends of the guide thimbles are fixed in holes formed in the top nozzle by being expanded after insertion to conform to the shape of the holes and annular grooves therein.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One commercial reconstitutable fuel assembly construction, similar to that illustrated and described is U.S. Pat. No. 3,828,868 to Jabsen, employs a threaded arrangement for attaching the the top nozzle to the control rod guide thimbles so that the top nozzle can be removed to gain access to the fuel rods contained in the fuel assembly. The top nozzle removal method consists of, first, unscrewing a multitude of threaded connections, for example sixteen, to release the top nozzle from the guide thimbles, and then, pulling the top nozzle over the external threads during removal. The sequence is reversed during top nozzle replacement.

Removal and replacement of the top nozzle from and to the threaded portions of the guide thimbles as well as retightining the threaded connections increases the risk of damaging the threads. Any thread seizure or damage incurred during removal and replacement can ruin the fuel assembly skeleton and require that a new one be substituted for it. Consequently, a need exists for improvement in the method of removing the top nozzle from the guide thimbles and in the apparatus allowing for removability of the top nozzle.

SUMMARY OF THE INVENTION

The present invention provides improved method and apparatus for removing and replacing a top nozzle of a nuclear reactor fuel assembly which is designed to satisfy the aforementioned needs. The present invention modifies a prior art top nozzle so as to improve its removabily and increase its holddown spring reliability.

Specifically, in contrast to the plurality of threaded connections which must each be manipulated one at a time to assemble and disassemble the prior art top nozzle to the guide thimbles, the present invention provides an adapter plate of the top nozzle with a plurality of holes having annular grooves which can be interfitted with pre-bulged slotted tubes connected to the guide thimbles and a plurality of locking tubes which can be moved between locking and unlocking positions simultaneously for locking the top nozzle to and removing it from the guide thimbles via the slotted tubes. The locking tubes are mounted to a bearing plate which, in turn, is coupled to the top nozzle by a dual stop arrangement which permits the top nozzle, bearing plate and plurality of locking tubes to be removed as a unit in a rapid and easy manner from the guide thimbles. Also, no mechanical locking nor individual handling of the locking tubes is required.

Further, in contrast to the single large holddown spring used with the prior art top nozzle, the present invention provides a plurality of smaller holddown springs associated with the plurality of locking tubes. In the prior art single spring approach, a failure can represent a total loss of holddown force; with the multiple spring approach of the present invention, loss of a single spring results in loss of only a fraction of the holddown force.

Accordingly, the present invention sets forth in a fuel assembly having a top nozzle and a plurality of control rod guide thimbles, improved method and apparatus for removably mounting the top nozzle on the upper ends of the guide thimbles which comprise the operative steps of: (a) releasably mating a plurality of hollow outer sockets defined in the top nozzle with a plurality of hollow inner sockets defined on the upper ends of the guide thimbles, the inner sockets being movable between compressed conditions for removing and inserting the inner sockets from and into the outer sockets in mounting and removing the top nozzle on and from the guide thimbles and expanded conditions for mating the inner and outer sockets together and locking the top nozzle on the guide thimbles; (b) supporting a plurality of elongated locking tubes such that end portions thereof extend into the outer sockets defined in the top nozzle; and (c) moving all of the locking tubes at the same time between unlocking and locking positions to displace their end portions axially within the outer sockets between first locations where the locking tubes allow the inner sockets to be moved between compressed and expanded conditions to remove and insert the inner sockets from and into the outer sockets and thereby mount and remove the top nozzle on and from the guide thimbles, and second locations where the locking tubes retain the inner sockets in expanded conditions to prevent removal of the inner sockets from the outer sockets and thereby removal of the top nozzle from the guide thimbles.

At their first locations, the end portions of the locking tubes are withdrawn from the inner sockets, while at their second locations the end portions of the locking tubes are inserted within the inner sockets. Furthermore, the locking tubes are supported on, and movable relative to, the top nozzle by mounting the locking tubes on a common plate and then mounting the common plate to the top nozzle for movement between non-release and release positions. At the non-release positions of the locking tubes, the end portions of the locking tubes are disposed at their first locations inserted within the inner sockets, while at the release positions they are disposed at their second locations withdrawn from the inner sockets. A first set of stops are removably attached to the top nozzle for retaining the common plate in its non-release position. When the first set of stops are removed, the plate can be moved relative to the top nozzle to its release position against a second set of stops on the top nozzle which allows removal of the top nozzle from the guide thimbles while retaining the locking tubes and common plate mounted to the top nozzle in position for facilitating replacement of the top nozzle back on the guide thimbles. The common plate is biased for movement in a direction away from the top nozzle by a plurality of holddown springs installed about the plurality of locking tubes and captured between the common plate and flanges on the end portion of the tubes.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE PREFERRED EMBODIMENT

Figure 1:
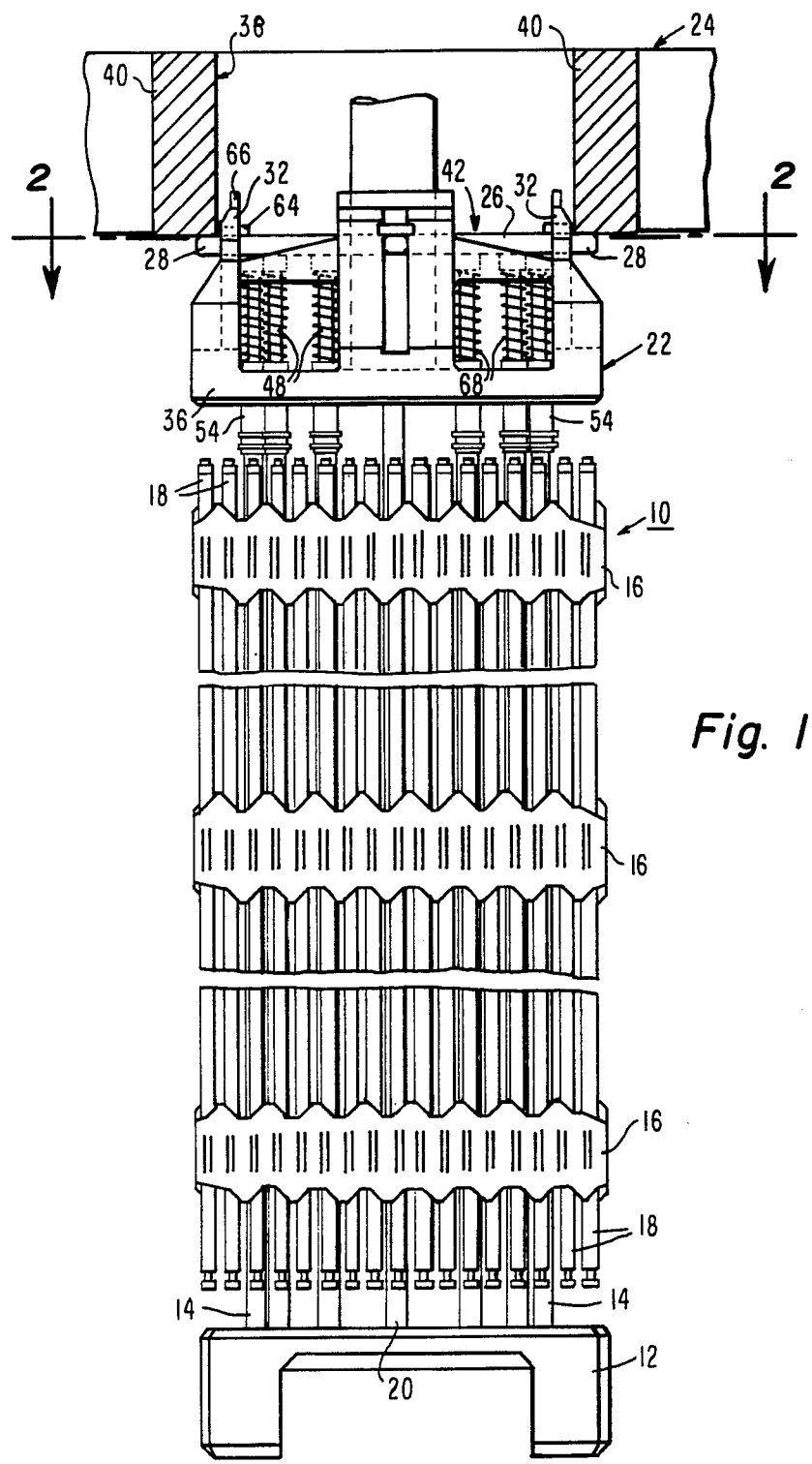
FIG. 1 is a partially sectioned elevational view, with parts being broken away for clarity, of a fuel assembly formed in accordance with the principles of the present invention.

In the following description, like reference characters designate like or corresponding parts throughout the several views of the drawings. Also, in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is constructed in accordance with well known practices and incorporates a preferred embodiment of the present invention.

Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper end of the guide thimbles 14 in accordance with the present invention which will be fully described below. With such an arrangement of parts, the fuel assembly 10 forms an integral unit capable of being conveniently handled without damaging the assembly parts.

The top nozzle 22 yieldably interconnects the fuel assembly 10 to a upper core plate 24 of the reactor core (not shown) via a holddown retainer or bearing plate 26. The plate 26 has a plurality of tangs 28, preferably four in number, which are orthogonally arranged with respect to one another and project radially outward from the center of the plate. Each of the tangs 28 is received in and extends outwardly beyond a vertical slot 30 formed in an upstanding guide structure 32 located midway between the ends of each side 34 of a generally rectangular-shaped, transversely-extending adapter plate 36 of the top nozzle 22. As seen in FIG. 1, the upper ends of the guide structures 32 fit into a cell or cavity 38 defined in the upper core plate 24 by wall portions 40 thereof which overlie and engage the tangs 28 of the bearing plate 26. Due to the yieldable mounting relationship of the top nozzle 22 to the upper core plate 24 via the bearing plate 26 to be described in detail below, changes in the length of the fuel assembly 10 due to core induced thermal expansion and the like is accommodated.

Improved Apparatus for Removably Mounting Top Nozzle

Now, while referring to FIGS. 1 through 3, with particular reference to FIGS. 2 and 3, the preferred embodiment of the improved apparatus, generally designated 42, for removable mounting the top nozzle 22 on the upper ends of the guide thimbles 14 will be discussed. The improved mounting apparatus 42 basically comprises a plurality of hollow outer sockets 44 defined in the top nozzle 22 (only one of which is seen in FIG. 3), a plurality of hollow inner sockets 46 defined on the upper ends of the guide thimbles 14 (only one of which is seen in FIG. 3), a plurality of locking tubes 48 with 20 each tube having a lower end portion 50, and means 52 supporting the locking tubes 48 with their lower end portions 50 extending into the outer sockets 44 and for movement at the same time relative to the outer sockets between unlocking and locking positions. In their unlocking positions, the locking tubes allow the top nozzle 22 to be either placed on or removed from the guide thimbles 14. On the other hand, when the locking tubes 48 are in their locking positions, the top nozzle 22 is prevented from being removed from the guide thimbles 14. Each of these four components, the outer sockets 44, the inner sockets 46, the locking tubes 48 and the supporting means 52, will now be discussed separately in detail. Although the description that follows in directed to the arrangement of one set of the components, where such set includes one outer socket 44, one inner socket 46 and one locking tube 48, since only one set is shown in FIG. 3, it will be readily understood that such description applies equally to all of such sets of these components.

Figure 6:
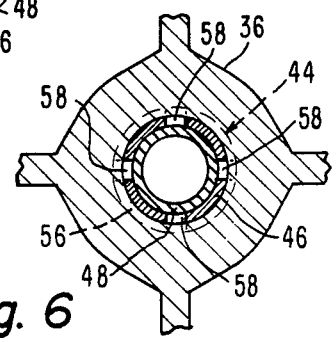
FIG. 6 is a sectional view of the inner and outer sockets and lower end portion of the one locking tube of the improved apparatus, as taken along line 6—6 of FIG. 3.
Figure 8:
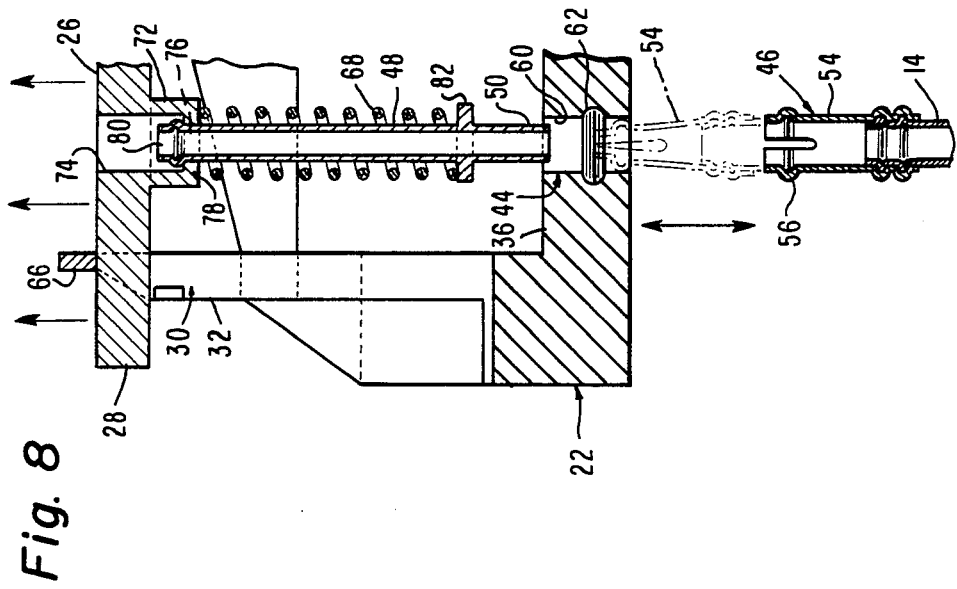
FIGS. 7 and 8 are views similar to that of FIG. 3, but depicting the steps in removal of the top nozzle from the one guide thimble using the improved appatatus of the present invention.

As seen in FIG. 3, inner socket 46 of the improved apparatus 42 is preferably in the form of an elongated sleeve 54 having its lower end bulge fitted, in a well known manner, on the upper end of the guide thimble 14. A circumferential bulge 56 is formed on the upper end portion of the sleeve 54 and at least one, and preferably four, (as seen in FIG. 6), elongated slots 58 are provided in the sleeve's upper end portion. The cross-sectional shape of the bulge 56 is in the form of an arc, the purpose being to conform with the shape of the outer socket 44 to be described shortly. The four elongated slots 58 are equally spaced about the wall of the sleeve 54 and extend axially from the top edge of the sleeve downwardly through and a short distance beyond the bulge 56. The purpose of the slots 58 is to permit inward elastic collapse of the upper end portion of the sleeve 54 (a compressed condition as seen in FIG. 8) for inserting and removing the inner socket 46 into and from outer socket 44. It should be noted here that the above described inner socket 46 may be the upper end of the guide thimble itself (without the use of a sleeve) with the circumferential bulge formed on and the elongated slots being provided in the upper end portion of the thimble.

Figure 5:
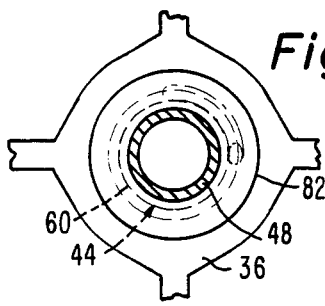
FIG. 5 is a plan view of a flange on the lower end portion of one of the locking tubes of the improved apparatus, as seen along line 5—5 of FIG. 3.
Figure 7:
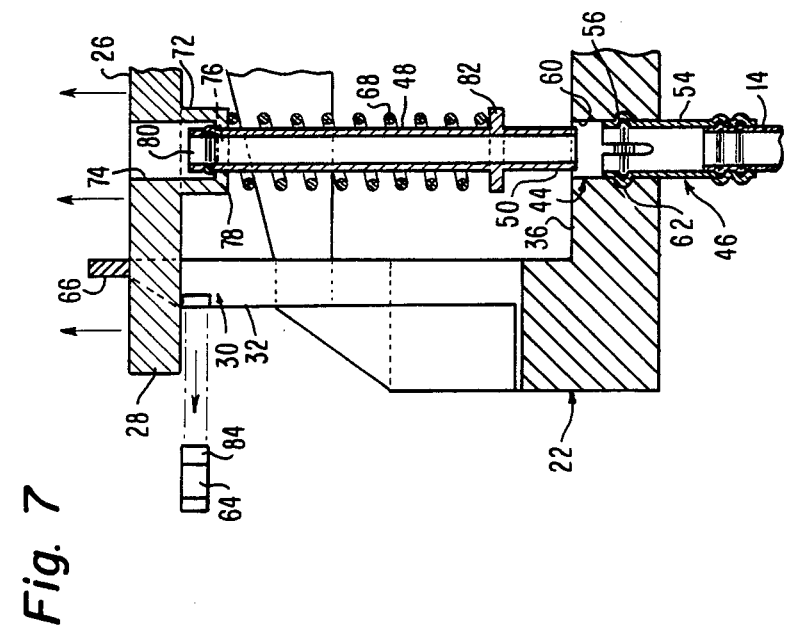

Still referring to FIG. 3, the outer socket 44 of the improved apparatus 42 preferably takes the form of an axial extending passageway or bore 60 defined in the adapter plate 36 of the nozzle 22. The bore 60, as seen in dashed outline in FIG. 5, is cylindrical in shape having a diameter generally equal to the outer diameter of the sleeve 54. The bore 60 has an annular groove 62 defined therein at a location somewhat closer to its lower end than to its upper end. The annular groove 62 has a cross-sectional shape in the form of an arc conforming to the arcuate shape of the bulge 56 of sleeve 54. Also, the diameter of the annular groove 62 is generally equal to the outer daimeter of the bulge 56 when the upper end portion of the sleeve 54 is in its normal expanded condition, as seen in FIGS. 3 and 7. In the expanded condition of the sleeve upper end portion, the bulge 56 is in mating engagement with the annular groove 62. However, if the top nozzle 22 is lifted upwardly relative to the guide thimbes 14, such as depicted in FIG. 8, the upper end portion of the sleeve 54 collapses to its compressed condition and the bulge 56 unmates from the annular groove 62 as the annular groove moves upwardly with the top nozzle relative to the bulge 56 which is stationarily-positioned with the guide thimble 14.

Again referring to FIG. 3, the locking tube 48 of the improved apparatus 42 preferably is in the form of an elongated hollow tube having an outer diameter slightly less than the inner diameter of the inner socket 46 when the latter is in its expanded condition, such as seen in FIG. 3. The locking tube 48 can be positioned to prevent unmating of the bulge 56 from the annular groove 62 and thereby removal of the top nozzle 22 from the guide thimble 14. As shown in FIG. 3, the locking tube 48 can be placed in a locking position in which its lower end portion 50 is axially displaced to a lowered location within the inner socket 46 so as to retain the inner socket in its expanded condition in the outer socket 44. In its locking position, the tube 48 thus prevents removal of the inner socket 46 from the outer socket 44 and thereby removal of the top nozzle 22 from the guide thimbles 14. On the other hand, the locking tube 48 can be moved to an unlocking position, such as seen in FIG. 7, in which its lower end portion 50 is axially displaced to a raised location still within the outer socket 44 but withdrawn from the inner socket 46. In its unlocking position, the tube 48 thus allows the inner socket 46 to be moved between its compressed and expanded conditions to remove and insert the inner socket from and into the outer socket 44 and thereby mount and remove the top nozzle 22 on and from the guide thimbles 14.

Figure 2:
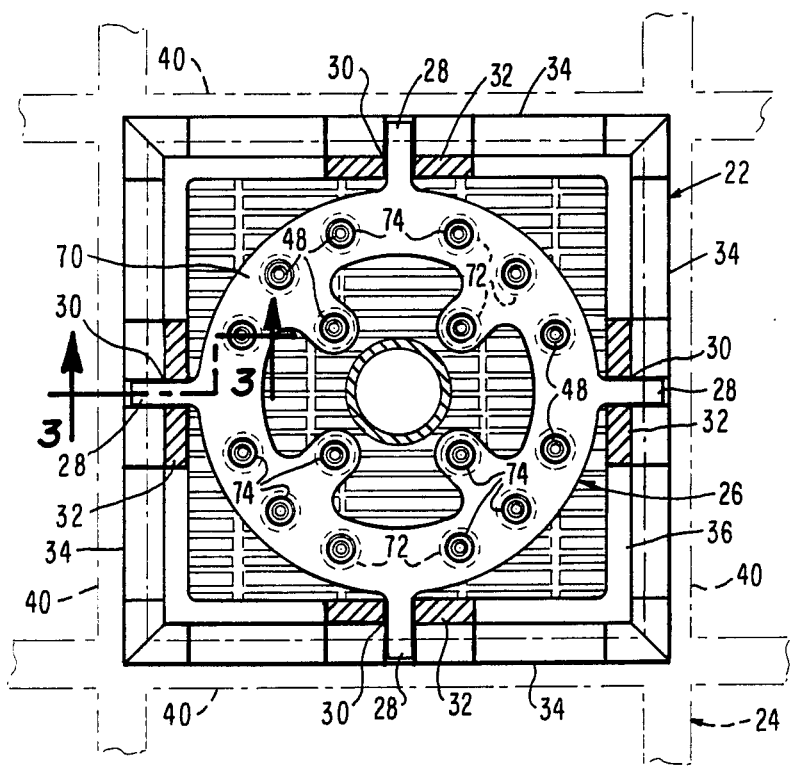
FIG. 2 is an enlarged, top plan view of the fuel assembly, as seen along line 2—2 of FIG. 1.
Figure 3:
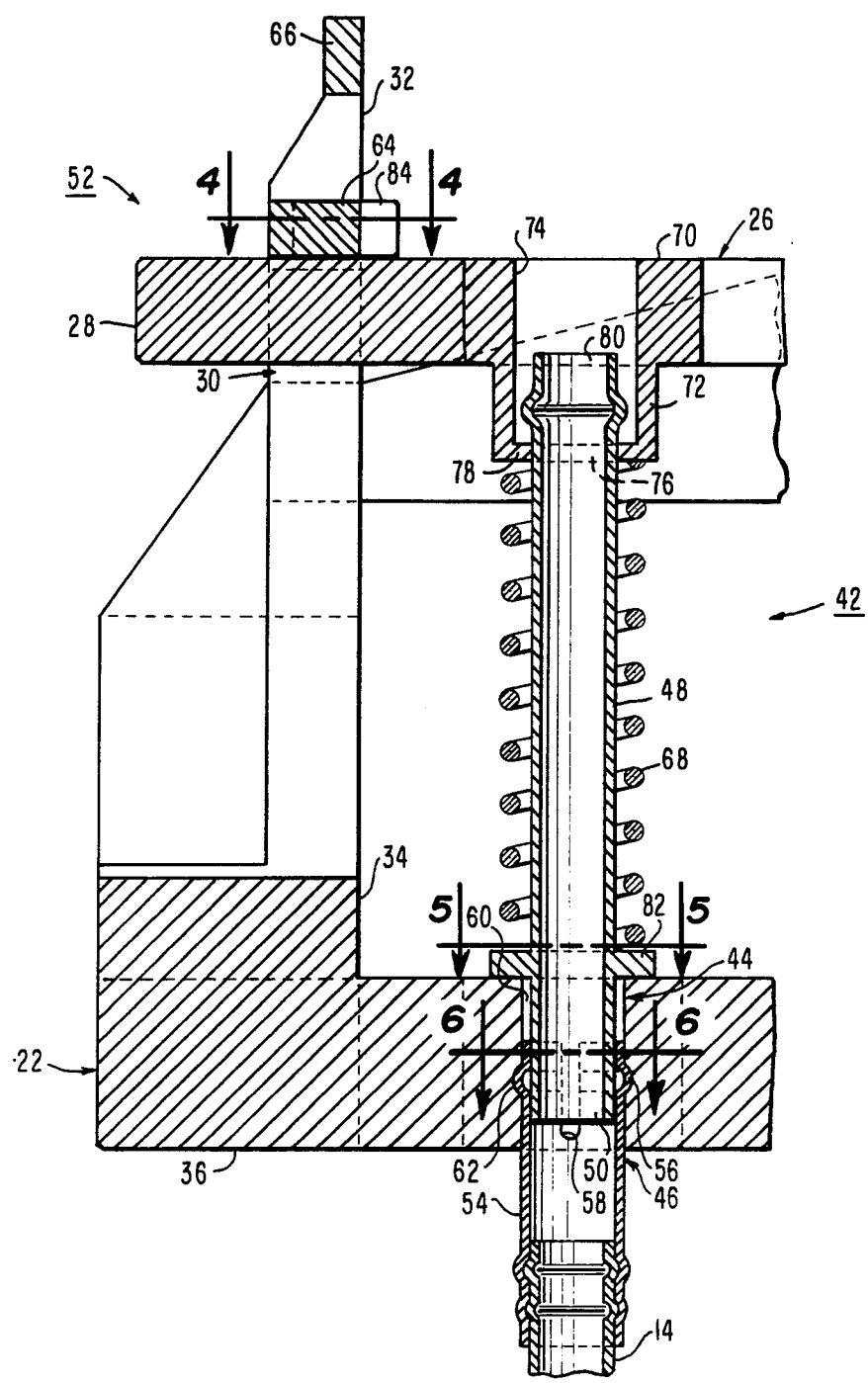
FIG. 3 is an enlarged, fragmentary sectional view of the improved apparatus of the present invention, as taken along line 3—3 of FIG. 2, showing the apparatus mounting the top nozzle to one of the guide thimbles of the fuel assembly.

Lastly, the supporting means 52 of the improved apparatus 42, as seen overall in FIGS. 1 and 2 and in greater detail in FIG. 3, supports the locking tubes 48 at and for movement together between their locking and unlocking positions and thus axial displacement of their lower end portions 50 between their lowered and raised locations within the outer socket 44. Basically, the supporting means 52 includes the combination of bearing plate 26, guide structures 32 on the top nozzle 22, lower and upper sets of stops 64,66 and coiled holddown springs 68.

As seen most clearly in FIG. 2, the bearing plate 26 has an inner portion 70 designed to receive and support each of the plurality of locking tubes 48. Specifically, tubular hollow bosses 72 are connected to the inner portion 70 of the plate 26 and extend downwardly in alignment with holes 74 formed therein.

Referring to FIG. 3, each of the bosses 72 is also aligned with one of the bores 60 formed in the adapter plate 36 of the top nozzle 22. The bottom end of the boss 72 contains a central opening 76 defined by an annular ledge 78. The locking tube 48 is inserted up through the central opening 76 of the boss 72 and the hole 74 of the inner plate portion 70 and then its upper end portion 80 is bulged or otherwise enlarged so that it will not fit down through the central opening 76 of the boss, but instead will overlie and rest on the annular ledge 78. Downward displacement of the locking tube 48 relative to the bearing plate 26 and adapter plate 36 is limited by an annular flange 82 connected about the lower end portion 50 of the tube 48 but spaced upwardly from the lower edge thereof. With the flange 82 resting on the upper surface of the adapter plate 36, the lower end portion 50 of the locking tube 48 will extend into the lower socket 46 when it is mated with the outer socket 44, as depicted in FIG. 3.

As mentioned above, the bearing plate 26 also includes a plurality of tangs 28 which align the plate in the guide structures 32 of the top nozzle 22. As seen in FIG. 2, the tangs 28 are orthogonally arranged with respect to one another and project radially outward from the inner portion 70 of the plate 26. Each of the tangs 28 is received in and extends outwardly beyond the vertical slot 30 formed in each upstanding guide structure 32.

Lower and upper sets of stops 64,66 are spaced apart vertically and connected to the guide structures 32 so as to define a lower, non-release position (see FIG. 3) and an upper, release position (see FIGS. 7 and 8) of the bearing plate 26 relative to the top nozzle 22. As seen in FIG. 3, the length of the locking tube 48 is such that the tube assumes it locking position with the lower end portion 50 disposed at its lowered location inserted in the inner socket 46 when the bearing plate 26 is held at its lower, non-release position by the lower set of stops 64. The lower stops 64 are removable from the guide structures 32 and when removed, the bearing plate 26 is no longer retained in its non-release position of FIG. 3. The upper set of stops 66 are fixed to the guide structures 32 and allow the bearing plate 26 to be moved to its upper, release position, as seen in FIG. 7, when the lower set of stops 64 have been removed. When the plate 26 assumes its upper, release position, the locking tube 48 assumes its unlocking position with its lower end portion 50 now disposed at the raised location where the end portion is withdrawn from the inner socket 46 but still extends slightly into the outer socket 44.

Finally, the holddown springs 68 of the supporting means 52 individually surround the locking tubes 48 and bias the bearing plate 26 in an upward direction away from the adapter plate 36 of the top nozzle 22. Each spring 68 is assembled about one of the tubes 48 before the latter is inserted through the central opening 76 in the respective boss 72 and bulged at its upper end. Each spring 68 is placed in a state of precompression, bearing at its lower end against the flange 82 of the tube 48 and at its upper end against the bottom end of the boss 72. It can be seen that the bulged upper end portion 80 of the locking tube 48 restricts upward movement of the bearing plate 26 caused by the bias of the springs 68, but not downward movement of the plate 26.

Thus, during normal operation, the total holddown force of springs 68 is reacted by the bearing plate 26 with the latter being held at its lower, non-release position by the four removable lower stops 64 mounted in the guide structures 32 which contact the upper surfaces of the bearing tangs 28. When the reactor upper core plate 24 is installed, the tangs 28 are pushed downward by wall portions 40 of plate 24 and this compresses the springs 68 even further and provides the required holddown force which accomodates any fuel assembly growth in its length. The locking tubes 48, in turn, lock the top nozzle 22 in the desired mounting relationship with the upper ends of the guide thimbles 14 and limit lateral vibration of the holddown springs 68.

Figure 4:
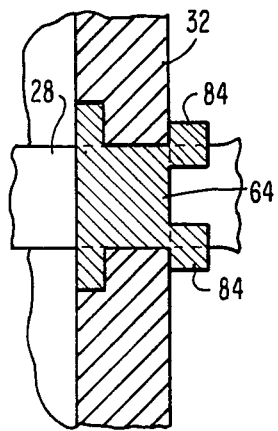
FIG. 4 is a fragmentary sectional view of one of the lower stops of the improved apparatus, as taken along line 4—4 of FIG. 3.

FIGS. 7 and 8 show two sequential stages in the removal of the top nozzle 22 from the fuel assembly guide thimbles 14. First, as depicted in FIG. 7, the four lower pins or stops 64 are removed. This is accomplished by pushing them radially outward so as to overcome their upset metal stakes 84, as seen in FIG. 4, which hold them in the guide structures 32. This allows the bearing plate 26 to move upward along the guide structure slots 30 to its release position against the upper stops 66 fixed across the slots 30 of the guide structures 32. Concurrently, the locking tubes 48 move to their unlocking positions so that their lower end portions 50 clear the inner sockets 46. The top nozzle 22 can now be lifted off of the upper sockets of the guide thimbles 14, as seen in FIG. 8.

To reinstall the top nozzle 22, it is aligned with the guide thimbles 14 and the inner sockets 46 are engaged with the outer sockets 44 of the adapter plate 36. Then, the bearing plate 26 is pushed downward to engage the locking tubes 48 into the inner sockets 46. Finally, new lower pins or stops 64 are reinstalled in the guide structure slots 30 and the installion is complete.

It should be noted that for manufacturing, the entire top nozzle 22 and improved apparatus 42 for removably mounting it on the guide thimbles 14, including the inner sockets 46, can be subassembled, and then the assembly can be attached by bulges to the guide thimbles to form a complete fuel assembly. This eliminates welding on the final assembly. The upper stops hold the bearing plate in its release position after initial assembly during manufacturing and prior to initial installation on the fuel assebly. For reconstituting the fuel assembly, it will be seen that the present invention eliminates the need to unscrew any threaded connections. It only requires the removal of four stops to remove the top nozzle 22 and the replacement of four stops for nozzle replacement.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We CLAIMS

1. In a fuel assembly having a top nozzle and a plurality of control rod guide thimbles, a method of removably mounting the top nozzle on the ends of the guide thimbles, comprising the steps of:
   (a) releasably mating a plurality of hollow outer sockets defined in said top nozzle with a plurality of hollow inner sockets defined on said ends of said guide thimbles, said inner sockets being movable between compressed conditions for removing and inserting said inner sockets from and into said outer sockets in mounting and removing said top nozzle on and from said guide thimbles and expanded conditions for mating said inner and outer sockets together and said top nozzle on said guide thimbles;

(b) supporting a plurality of elongated locking tubes such that end portions thereof extend into said outer sockets defined in said top nozzle; and (c) moving all of said locking tubes at the same time between unlocking and locking positions to displace their end portions axially within said outer sockets between first locations where said locking tubes allow said inner sockets to be moved between compressed and expanded conditions to remove and insert said inner sockets from and into said outer sockets and thereby mount and remove said top nozzle on and from said guide thimbles, and second locations where said locking tubes retain said inner sockets in expanded conditions to prevent removal of said inner sockets from said outer sockets and thereby removal of said top nozzle from said guide thimbles.

2. The top nozzle mounting method as recited in claim 1, wherein said end portions of said locking tubes are withdrawn from said inner sockets when said locking tubes are moved to said unlocking positions and are inserted into said inner sockets when said locking tubes are moved to said locking positions.

3. The top nozzle mounting method as recited in claim 1, wherein said supporting of said locking tubes includes mounting said tubes on a common plate.

4. The top nozzle mounting method as recited in claim 3, wherein said moving of said locking tubes includes mounting said common plate for movement between non-release and release positions relative to said top nozzle, said end portions of said locking tubes being disposed at their first locations inserted within said inner sockets when said common plate is at its non-release position and being disposed at their second locations withdrawn from said inner sockets when said common plate is at its release position.

5. The top nozzle mounting method as recited in claim 4, further comprising removably attaching a first set of stops to said top nozzle for retaining said common plate in its non-release position, said plate being movable relative to said top nozzle to its release position when said first set of stops are removed.

6. The top nozzle removal method as recited in claim 4, further comprising holding said common plate against a second set of stops at its release position so as to allow removal of said top nozzle from said guide thimbles while retaining said locking tubes and common plate mounted to said top nozzle for facilitating positioning thereof for replacement of said top nozzle back on said guide thimbles.

7. In a fuel assembly having a top nozzle and a plurality of control rod guide thimbles, an improved apparatus for removably mounting the top nozzle on ends of the guide thimbles, comprising:

(a) means defining a plurality of hollow outer sockets in said top nozzle;

(b) means defining a plurality of hollow inner sockets on said ends of said guide thimbles, said inner sockets being movable between compressed conditions for removing and inserting said inner sockets from and into said outer sockets in mounting and removing said top nozzle on and from said guide thimbles and expanded conditions for mating said inner and outer sockets together and said top nozzle on said guide thimbles;

(c) a plurality of elongated tubes, each tube having an end portion; and (d) means supporting said locking tubes such that said end portions thereof extend into said outer sockets defined in said top nozzle, said means further supporting all said locking tubes for movement at the same time between locking positions to displace their end portions axially within said outer sockets between first locations where said locking tubes allow said inner sockets to be moved between compressed and expanded conditions to remove and insert said inner sockets from and into said outer sockets and thereby mount and remove said top nozzle on and from said guide thimbles, and second locations where said locking tubes retain said inner sockets in expanded conditions to prevent removal of said inner sockets from said outer sockets and thereby prevent the removal of said top nozzle from said guide thimbles.

8. The top nozzle mounting apparatus as recited in claim 7, wherein at their first locations said end portions of said locking tubes are withdrawn from said inner sockets, while at their second locations said end portions of said locking tubes are inseretd within said inner sockets.

9. The top nozzle mounting apparatus as recited in claim 7, wherein said supporting means includes:

guide means on said top nozzle; and a plate mounted on said top nozzle for movement along said guide means between non-release and release positions relative to said top nozzle, said plate mounting said locking tubes such that said end portions thereof are disposed at their second locations inserted within said inner sockets when said plate is at its non-release position and disposed at their first locations withdrawn from said inner sockets when said plate is at its release position.

10. The top nozzle mounting apparatus as recited in claim 9, wherein said supporting means further includes:

a first set of stops removably attached to said guide means of said top nozzle for retaining said plate in its non-release position; and means disposed between said plate and said top nozzle biasing said plate in a direction away from said top nozzle.

11. The top nozzle mounting apparatus as recited in claim 10, wherein said supporting means further includes:

a second set of stops attached to said guide means of said top nozzle for allowing said plate to be moved to its release position when said first set of stops have been removed from said guide means and thereby allow removal of said top nozzle from said guide thimbles while retaining said locking tubes and said plate mounted to said top nozzle for facilitating positioning thereof for replacement of said top nozzle back on said guide thimbles.

12. The top nozzle mounting apparatus as recited in claim 10, wherein said biasing means includes a plurality of coiled springs, each spring being disposed about one of said locking tubes between said plate and a flange on said locking tube adjacent said top nozzle, said each spring being in a state of compression for biasing said plate for movement away from said top nozzle.

13. The top nozzle mounting apparatus as recited in claim 12, wherein each of said locking tubes includes means disposed on a side of said plate opposite to said spring which limits movement of said tube relative to said plate toward said top nozzle.

14. In a fuel assembly having a top nozzle and a plurality of control rod guide thimbles, an improved apparatus for removably mounting the top nozzle on ends of the guide thimbles, comprising:
- (a) means defining a plurality of hollow outer sockets defined in said top nozzle;
- (b) means defining a plurality of hollow inner sockets on said ends of said guide thimbles, said inner sockets being movable between compressed conditions for removing and inserting said inner sockets from and into said outer sockets in mounting and removing said top nozzle on and from said guide thimbles and expanded conditions for mating said inner and outer sockets together and said top nozzle on said guide thimbles;
- (c) a pluarality of elongated locking tubes, each tube having an end portion;
- (d) guide means on said top nozzle;
- (e) a plate mounted on said top nozzle for movement along said guide means between non-release and release positions relative to said top nozzle, said plate mounting said locking tubes such that said tubes are disposed in locking positions with their end portions disposed at first locations inserted within said inner sockets when said plate is at its non-release position and in unlocking positions with their end portions disposed at second locations withdrawn from said inner sockets when said plate is in its release position, said plate also supporting all of said locking tubes for movement at the same time between their unlocking and locking positions to displace their end portions axially within said outer sockets between said first locations where said locking tubes allow said inner sockets to be moved between compressed and expanded conditions to remove and insert said inner sockets from and into said outer sockets and thereby mount and remove said top nozzle on and from said guide thimbles and said second locations where said locking tubes retain said inner sockets in expanded conditions to prevent removal of said inner sockets from said outer sockets and thereby prevent the removal of said top nozzle from said guide thimbles;
- (f) a lower set of stops removable attached to said guide means of said top nozzle for retaining said plate in its non-release position;
- (g) means disposed between said plate and said top nozzle and about each of said locking tubes for biasing said plate in a direction away from said top nozzle; and
- (h) an upper set of stops attached to said guide means of said top nozzle for allowing said plate to be moved to its release position when said lower set of stops have been removed from said guide means and thereby allow removal of said top nozzle from said guide thimbles while retaining said locking tubes and said plate mounted to said top nozzle for facilitating positioning thereof for replacement of said top nozzle on said guide thimbles.

* * * * *